June 5, 1923.

H. C. EGERTON

PROCESS OF MAKING SHOES, BOOTS, ETC

Filed Oct. 18, 1918   2 Sheets-Sheet 1

1,457,826

Patented June 5, 1923.

1,457,826

UNITED STATES PATENT OFFICE.

HENRY C. EGERTON, OF RIDGEWOOD, NEW JERSEY.

PROCESS OF MAKING SHOES, BOOTS, ETC.

Application filed October 18, 1918. Serial No. 258,742.

*To all whom it may concern:*

Be it known that I, HENRY C. EGERTON, a citizen of the United States, and resident of Ridgewood, county of Bergen, State of New Jersey, have made a certain new and useful Invention Relating to Processes of Making Shoes, Boots, Etc., of which the following is a specification, taken in connection with the accompanying drawing.
This invention relates especially to processes of making shoes and other articles, such as boots, leggings, and so forth as hereinafter described in greater detail. Phenolic condensation cementing material, such as bakelite, condensite or redmanol compositions may advantageously be used to stiffen, strengthen and unite fabric or fibrous elements of shoes and other articles which may be coated or impregnated with such cementing material and then heat cured preferably under pressure, which may also finish the surface of the article and render it waterproof or water-repellant. This heat curing method may also be used to secure or cement vulcanized rubber layers or portions to such elements or articles, and such cured impregnated fabric may be advantageously used to incorporate metallic reenforcing or other members in or to attach them to vulcanized rubber shoe soles, for instance. When one or more sheets or layers of canvas or other fabric carrying or impregnated with dried bakelite varnish or other suitable phenolic condensation cementing material are forced against a layer or sheet of suitable vulcanizable rubber composition in a mould at the usual vulcanizing heat of about 300° F. or so, the phenolic condensation cementing material seems to soften and melt more readily, so that under the moulding pressure the rubber forces its way sufficiently into the pores or interstices of the fabric or fibrous material so as to be securely united and interlocked when the vulcanizing and curing process is completed in an hour more or less. Such a union may be facilitated by interposing between the elements a canvas or other connector fabric which has been previously frictioned or otherwise rubber coated on the side adjacent the vulcanizable rubber composition, while the other side may have been previously coated or impregnated with phenolic condensation cementing material, or may be supplied therewith by the adjacent fabric during the heat curing and uniting process; and if desired, of course, a single heavy sheet of rubberized canvas or other fabric may be thus united to vulcanized rubber and stiffen and strengthen the same when containing sufficient cured phenolic condensation cementing and stiffening material. In some cases it is desirable to preliminarily mould or cure fabric, fibrous or other porous material containing such phenolic condensation cementing material and to subsequently unite a rubber layer or element thereto, and this may be advantageously effected by curing and hardening the cementing material in the rubberized fabric or other article for correspondingly longer periods at lower temperatures of 200° F. or thereabouts which do not undesirably vulcanize or affect the frictioned or other rubberized coating or prevent its subsequent vulcanizing union to the rubber element. Canvas or other woven or knit fabric may be used in this way and also braided, woven or twisted cords, tape, webbing or small rope or other fibrous or porous form of material which is not undesirably affected by the curing or vulcanizing heats employed; and of course the rubber compositions may comprise coloring, inert, fibrous, wear resisting or other special components or elements in any suitable proportion and their vulcanization may be controlled by the usual accelerating or controlling materials used therefor.

In the accompanying drawings showing in a somewhat diagrammatic way various types of shoes, boots and other illustrative articles which may be made by these processes.

Fig. 18 is a perspective view showing the completed article.

Figures 1, 3:
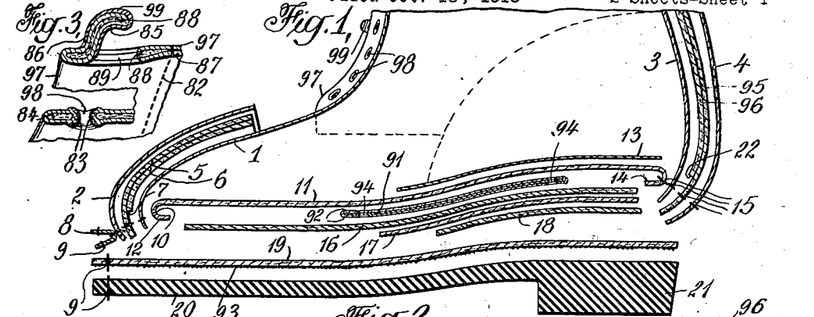
Fig. 1 is a longitudinal section showing in separated position the parts which may be used to form such a shoe.
Fig. 3 is a detail sectional view showing lacing and fastening devices for this construction.

In the illustrative arrangement shown in Fig. 1, the upper 1 of any suitable material, such as canvas, which for instance, has a waterproof or other desired coating, may be reenforced adjacent the toe by a toe box formed of one or more thicknesses of heavy canvas or other fabric impregnated with phenolic condensation cementing material which may be cured at suitable heat for sufficient time to convert it into the solid permanent form throughout at least a considerable part of the toe box. The lower edges of this toe box below about the point 7, where if desired, the material may have only a single thickness, may be left in partly cured soft condition in which it is much more flexible and readily cemented to other phenolic impregnated elements. The upper part may, if desired, comprise several thicknesses of impregnated canvas or the like, such as 5, 6, to give ample strength and stiffness; and the toe box may be covered by a toe cap 2 of any suitable material, such as coated or waterproofed canvas, if desired. A similarly impregnated and stiffened counter or heel stiffening member may be formed of a plurality of layers 95, 96, of phenolic impregnated canvas which may be cured in the upper part into the solid strong condition usually known as the moderate curing of such material, so as to retain the desired shape permanently, while the lower part of this counter below about the point 22 may be formed of a single thickness of material which may for some purposes be advantageously left in the soft or partially cured condition.

Figure 2:
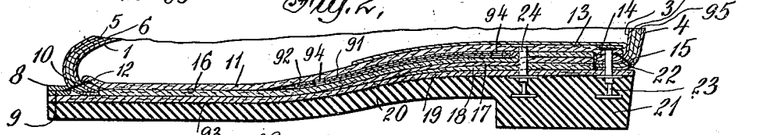
Fig. 2 is a partial longitudinal section through the completed shoe.

In lasting the shoe the upper, toe box, toe cap and counter may, for example, be stitched to the insole 11 of any suitable construction which may advantageously be formed of one or more layers of heavy fabric or canvas coated or impregnated with similar phenolic condensation cementing material which may also be substantially dried by elimination of the usual solvents and left in soft or uncured condition, so that the parts may be bent readily and the edge fin or portion bent down and inward to form an attaching flange 14 through which the lasting stitches may be secured along the lines 15 at the back of the shoe and along the dotted lines 10 at the toe. If desired, also, a welt strip, such as 8, of similarly impregnated heavy canvas or braided fabric, may be sewed into the front of the shoe by this lasting stitching and the welt strip may of course extend around the shoe about as far as the heel front as in ordinary leather shoe construction. The sole may be efficiently strengthened by incorporating therein a number of layers of such phenolic impregnated paper, cloth or other suitable material, preferably of a more or less fibrous character, including cotton waste, cotton batting, wood pulp or mixtures thereof, and for instance a filler strip 16 of this material may be applied next the in-sole 11 and one or more other stiffening strips 17, 18 of generally similar character also applied in so far as desirable to further stiffen the shank portion of the sole. A sole connector strip 19, which may extend throughout substantially the entire area of the shoe sole may then be applied so as to be in contact with these inner layers or elements and to engage the inturned portions or edges of the lasted upper shoe elements. These sole layers or elements may be securely and permanently united by compressing the parts and simultaneously curing or solidifying them by the necessary heat, maintained for sufficient time to convert the phenolic condensation cementing material with which they are impregnated into the desired solid stiff form. The welt strip under these conditions may, of course, be compressed against the sole connector strip 19, as shown in Fig. 2, and this may leave a projecting edge of this sole connector to which a leather or other sole may be attached in any suitable way as by stitching extending substantially along the line 9—9 around these elements. If desired metallic reenforcing or stiffening members, such as plates or strips of spring steel or other metal in sheet, wire or woven or braided wire form may be incorporated in these sole or other stiffeners. As indicated in Figs. 1 and 2, a shank stiffener 91 of spring steel or other suitable material may be incorporated preferably between different fabric layers carrying such phenolic condensation cementing material. In this way the cementing material in the adjacent fabric or fibrous material used, such as the fabric layers 11, 16, are strongly cemented together to and around the metallic reenforcement which to promote this union may have irregular portions or holes, such as 94, in various parts, such as the ends where bending strains are less severe. It is also desirable in some cases in order to promote adherence of the metal itself to the adjacent material to preliminarily apply a layer of bakelite metal enamel or other suitable phenolic condensation cementing material which has specially strong adherence to such metal. Preferably after suitably preparing the metal surface, such enamel compositions may be applied and baked or cured so as to form the coating 92 on the metal reenforcement before it is incorporated in the fabric stiffener and this promotes its adherence to the phenolic condensation cementing material in the adjacent fabric layers when the stiffener is cured.

It is sometimes advantageous, however, to simultaneously connect a rubber composition sole, such as 20, which may have the integral heel 21, to the other parts at the same time that the various phenolic condensation cementing material is cured. For this purpose it is usually desirable to have the sole connector 19 provided with a layer or coating of frictioned rubber composition which may be worked into the coarsely woven canvas or other fabric before it is impregnated or coated on its other side with the phenolic condensation material, such as bakelite varnish, although of course in some cases it may be desirable to simultaneously apply the frictioned or other rubber coating to one side of the fabric and the phenolic condensation cementing material to the other. In some cases, indeed, it is sufficient to have the sole connector to which the frictioned or other rubber coating has been applied, left otherwise untreated before it is forced into contact with the other impregnated or coated fabric elements; then during the heat curing and moulding operation the phenolic condensation cementing material contained in these adjacent elements may, after softening or melting, be forced into this connector member to a sufficient extent to securely cement it to these other elements without the necessity of any such cementing material being directly applied to or incorporated therein. Where a rubber heel is to be attached in this way it is sometimes desirable to provide suitable interlocking connecting members, such as the heel rivets 23, 24, which may extend up through the insole elements and be headed over inside of the same and have projecting headed portions to enter the rubber heel and interlock therewith during the vulcanizing process so as to ensure permanent connection under the hard service conditions to which they are liable. It is also desirable to have a cemented liner strip, such as 13, cover these rivets and be cemented in place to the other insole elements during the curing and vulcanizing process which takes place in suitably heated moulds capable of holding the parts together and exerting thereon the desired degree of compression.

The curing of the bakelite or other phenolic condensation cementing material may be carried out at varying temperatures and complete curing can in most cases where relatively thin layers or blocks are being treated be effected in half an hour or an hour or so at temperatures around 300 degrees Fahrenheit. This corresponds quite closely with the vulcanizing temperatures of rubber sole compositions commercially used which can of course be regulated by the incorporation of different proportions of various accelerators or special vulcanizing agents and as well known the time of vulcanizing of these compositions can be retarded when desired by the incorporation of more of the inert weighting or mineral loading materials. In this way a single heat treatment under pressure may be used to vulcanize in place the rubber sole with or without the heel of the shoe and to permanently unite and shape up the sole reenforcing and connecting members and other parts including the usual shoe elements some of which may contain phenolic condensation cementing and stiffening material of this general character. In this way it is also possible to considerably strengthen and stiffen the upper or other parts of an ordinary canvas shoe, for instance, during the manufacture thereof. Ordinary bakelite varnish or other suitable phenolic condensation cementing material may be applied to the toe or counter portions or to other parts of the upper and after drying at moderate heats of 175 degrees or so Fahrenheit this cementing material may be cured preferably in suitable moulds at the same time that the shoe sole is vulcanized, which very materially stiffens and strengthens these parts of the shoe. For shoe uppers it is usually desirable to have considerably more flexibility and toughness than can be secured by such ordinary phenolic condensation cementing and stiffening material with canvas or similar fabric; and for this purpose a special cementing material may be advantageously used, comprising, besides the phenolic, aldehyde and solvent elements therefor, a very considerable proportion of a suitable miscible softening agent, such as castor oil. When castor oil is present in such proportion in the substantially dried phenolic condensation cementing material as to represent some 25 to 35 per cent thereof more or less, it not only seems to promote penetration of the dissolved cementing material throughout the fabric so as to thoroughly coat the ultimate fibres thereof but also even when thoroughly cured for one or more hours at temperatures of 250 to 300 degrees Fahrenheit or so, the fabric is left in a flexible, tough condition resembling leather which is highly advantageous for shoe uppers and similar purposes. Where it is desired to closely imitate the surface appearance and texture of leather, it is preferable to use a special grade of canvas or other heavy fabric which may be more or less napped or felted on its outside surface at least, before the special flexible soft curing grade of phenolic condensation cementing material is applied thereto preferably in dissolved condition and then dried and cured, preferably in moulds having their inner surfaces formed with slight ribs or creases to simulate a leather surface where this superficial appearance is to be given to the cured upper fabric. It is also desirable to have such upper material as the canvas upper 1 for instance previously dyed to substantially the color desired in the finished upper fabric, and the phenolic condensation cementing material applied thereto may advantageously be similarly colored by the incorporation of soluble dyestuffs in the composition or by the use of inert or other coloring matter therewith, so that in this way the texture of the fabric is subordinated or hidden and a more even color is secured in the finished material. While from some considerations, it is more desirable to make up and sew together the upper fabric and more or less shape it into its final form before the phenolic condensation cementing material or other composition applied thereto is hardened; yet in some cases at least rolls or long lengths or pieces of suitable fabric may be impregnated or treated with such special soft curing phenolic condensation cementing material and then either made up into shoe uppers or other articles and cured, or if desired the fabric may be partially or wholly cured in its original lengths before being tailored or otherwise shaped or made up into shoe uppers, leggings or other articles. One convenient way in which such special flexible phenolic condensation cementing material may be prepared is by incorporating in bakelite varnish No. 1 about 15 to 25 percent, or preferably about 20 percent, by weight, of ordinary castor oil which is miscible therewith especially if stirred into the same with moderate heat. The desired coloring matter may also be thoroughly incorporated before spreading, spraying or otherwise applying the material, preferably in a substantially uniform manner, to the shoe upper and other exposed fabric portions, such as the elements 2 and 4 of Fig. 1, preferably after the portions thereof which are to be securely cemented to the shoe sole or other relatively rigid elements, have been coated with the regular or harder curing grades of phenolic condensation cementing material. In this way a single heat curing and cementing process unites and cures all of the shoe elements; and a shoe upper of heavy canvas which has been treated with such special castor oil phenolic condensation cementing material is not only tough and yielding to a sufficient extent for service requirements, but may also be rendered about as permeable to air as ordinary upper leather while still being water resistant and substantially waterproof if desired.

If desired suitable fastening or lacing devices may be formed in the fabric upper or cooperating members, and as indicated in Fig. 1 eyelets 98 and lacing hooks or studs 99 carrying such phenolic condensation cementing material may, if desired, be formed in the upper or in the connected lacing flap 97. As is shown more in detail in Fig. 3, the fabric forming this lacing flap 97 may, if desired, be folded back on itself and its inner edge 87 secured as by stitching 82. It is usually desirable, however, before this is done to incorporate suitable strengthening members or pieces of cloth or other fabric thoroughly impregnated with such hard curing dried phenolic condensation cementing material as bakelite varnish No. 1, for example, and these strengthening members or disks, such as 84, 88, of heavy canvas or porous paper may be spaced along the lacing flap in the desired positions and united to the fabric by moderate heat and pressure sufficient to melt the phenolic condensation cementing material and cause it to adhere to the adjacent fabric which is then preferably in unfilled and uncoated condition to promote this action. Eyelets may be conveniently formed by punching the lacing holes 98 in such reenforced portions of the lacing flap or member and then curing the adjacent parts in a suitable mould at the desired heat, additional phenolic condensation cementing material, such as 83, being, if desired, added during the moulding as by being inserted in the mould members, or if desired, the mould elements may be so shaped as to force out of the adjacent parts sufficient phenolic condensation material 83 to form these slight enlargements indicated. This action, of course, cements these layers of fabric strongly together and the reenforced eyelets distribute the lacing strain so as to minimize tearing or weakening of the fabric. If desired an integral lacing hook or stud, such as 99, may be formed from such fabric reenforced phenolic condensation material as by severing and punching up a portion of the reenforced lacing flap or fabric which may advantageously have a heavy reenforcing disk or member 88 heavily coated or impregnated with suitable phenolic condensation cementing material, preferably arranged between the main lacing flap 97 and its refolded edge 87 and having tapering edge portions as indicated. The hole 89 may as indicated in Fig. 3 be cut or stamped in this reenforced material and the fabric layers carried up and shaped in a suitable mould to give them the desired hook or stud form preferably in connection with additional moulding bakelite or other suitable phenolic condensation cementing material, such as 85, 86, which may be applied to the fabric or inserted in the mould sections prior to this moulding operation which also preferably cures the parts in this desired position by the heat of the mould. It is of course desirable to coat or impregnate such an upper or lacing member after such integral lacing or fastening devices have been formed therein and the fabric may be sprayed or otherwise coated or impregnated with suitable hard curing or soft curing phenolic condensation material or both, or with other cementing or coating materials of any suitable character and color; and the subsequent heat curing can of course be performed in such way as not to undesirably affect the attached fastening devices.

Figure 4:
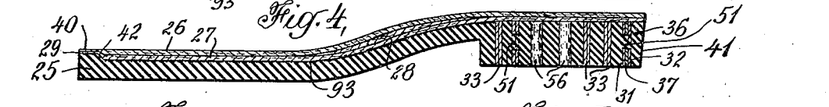
Fig. 4 is a longitudinal section showing another form of stiffened shoe sole and heel.

In the form of shoe shown in Fig. 4 the sole connector stiffener strip or member 27 may, if desired, have its lower surface coated with any suitable rubber composition 93 which may in some cases be frictioned thereto either before or simultaneously with the application of ordinary bakelite varnish or other suitable phenolic condensation cementing material to the other side of the strip or canvas member preferably so as to impregnate its fibres to a considerable extent at least. In case the sole connector does not have sufficient thickness and stiffness when cured an additional stiffening strip or layer 26 which may have phenolic condensation cementing material applied to or incorporated therewith may also be used and in some cases an additional layer of impregnated or other fabric 28 may be interposed or otherwise incorporated as an additional shank stiffener, as shown. In some cases it is desirable to more or less unite and shape or arch up these fabric stiffener members before they are united to the rubber shoe sole and for this purpose they may be moulded under pressure at sufficient heat to more or less cure them and solidify the incorporated phenolic condensation cementing material and if this is done at moderate temperatures of, say, 200° Fahrenheit or less for a number of hours these stiffening elements may, if desired, be completely cured or solidified without undesirably vulcanizing or altering the rubber layer or composition which may be present on the lower side of the sole connector 27. During the shaping and moulding of such impregnated fabric stiffeners, which if desired may be effected without the complete curing thereof, it is in many cases desirable to squeeze out a considerable portion or the major part of the phenolic condensation cementing material from the attaching edge portions of the stiffener elements as by compressing the same considerably more forcibly than the other parts of the stiffening members. For instance, these impregnated fabric strips may be preliminarily compressed in a cool or moderately heated mould so that the attaching edge portions 29, 40 may sometimes as indicated be reduced to even less than half of the thickness of the rest of the strips, if desired, while the adjacent portions 42 may be of gradually increasing thickness as indicated. In this way when the material is finally cured these attaching edge portions are relatively soft and yielding and are much more readily stitched or nailed to the shoe welt, leather or other sole or other parts than if they contained 40 or 50 percent of cured phenolic condensation cementing material. It is of course understood that similar results can be secured by applying in the first instance a relatively small proportion of such bakelite varnish or other suitable phenolic condensation material to these attaching edge portions of these stiffening elements and in such event all of the parts can be assembled and moulded together with the rubber composition shoe sole in the vulcanizing moulds. As indicated the shoe sole 25 of any suitable rubber composition may if desired, have the heel portion 41 and may be forced in the vulcanizing mould against the rubber coated side 93 of the sole connector so that when subjected to the curing and vulcanizing heat the sole is vulcanized and simultaneously united to the sole connector and the phenolic condensation cementing material is simultaneously cured preferably to the moderately cured completely solidified condition so as to have the stiffness, strength, waterproof properties and also the smooth upper surface desired, which can, of course, be secured in any of these forms of shoe sole by giving the cooperating mould element a smooth or polished surface. It is also advantageous to have the rubber composition sole strongly and permanently secured throughout substantially its entire area to the stiffener member, since this minimizes any tendency of the rubber to stretch or bag locally under service conditions.

Figures 5, 6, 7:
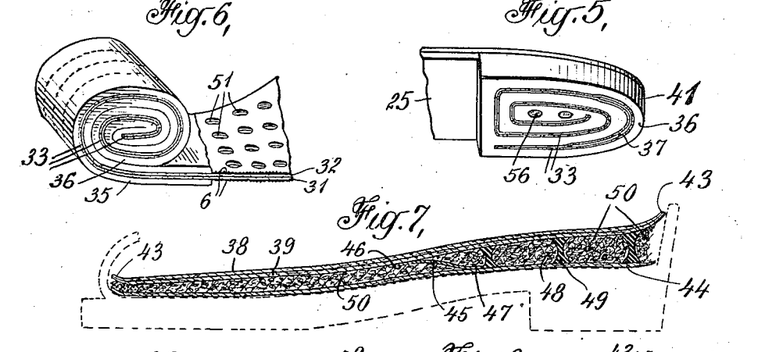
Fig. 5 is a perspective view showing this heel construction.
Fig. 6 is a diagrammatic perspective view showing a method of making such a heel.
Fig. 7 is a longitudinal vertical section through a cushioning insole member.

Any desired form of heel construction may be used with a shoe sole of this character and if desired the heel 41 shown in Figs. 4 and 5 may be of suitable rubber composition in which is incorporated one or more suitable spiral gripping heel ribs or members such as 33 which may have separated relatively rigid convolutions adapted to grippingly engage the ground or other surface which may cause the yielding of the adjacent portions of the rubber. Such a gripping rib may be formed of several united layers of fabric having their inner portions carrying phenolic condensation cementing material which may be incorporated therewith in any suitable way while the outer surfaces of these fabric strips may advantageously be previously coated or frictioned with any suitable rubber composition adapted to unite with the rubber composition used for the heel body. A convenient way of forming such a heel is indicated in Fig. 6 where a plurality of strips of fabric 31, 32 which may be specially woven duck, canvas or the like, may have originally applied thereto a frictioned or other coating 6 of rubber composition on their outer faces. The fabric may then be impregnated with suitable phenolic condensation cementing material such as bakelite varnish or the like, which may be partly or substantially dried either before or after the strips are forced together and the composite fabric strip may then preferably have punched or otherwise formed therein suitable junction holes 51 to promote the effective union of the rubber composition on both sides of the strip. Sheets or layers 35, 36 of suitable rubber composition may then be forced against the outer sides of these two strips of fabric as by rolling, for instance, which forces the raw rubber composition through the junction holes and effects union of these rubber connecting plugs therethrough and then this rubber fabric strip may be rolled up as indicated in Fig. 6 to form a roll or length of heel stock of the desired size, the gripping rib or fabric preferably extending to the outer end of the strip where it is more or less completely united to the fabric stiffening members as indicated in Fig. 4. Such a roll of heel stock may be shaped or moulded into the desired cross-section to form the heels to be manufactured and may then be cut or severed into the desired short lengths by band knives or other means so that the individual heels of this material may be applied to such a shoe sole as is indicated in Fig. 4, although a relatively thin rubber cushion layer may, if desired, be interposed between this composite heel member and the main stiffener members 26, 27 forming the backing layer or member of the shoe sole. The entire shoe sole may then be forced into a suitable mould and vulcanized at the desired heat which vulcanizes the rubber elements and permanently unites the parts together. If desired suitable metallic reenforcing and wear resisting members may be incorporated in the wearing surface or other portions of such shoe soles or the heel elements thereof and as shown in Figs. 4 and 5 one or more strips or sheets 37 of copper, steel or other metal may be incorporated in the vulcanized rubber heel 41 preferably by embedding them within the layers of canvas or other fabric carrying such phenolic condensation cementing and strengthening material. To facilitate the union of these parts the metal may, if desired, be formed with suitable holes indicated for cooperating with the holes 51 in the adjacent fabric, so that the vulcanized rubber may be forced into these holes and still more securely unite the parts through such interlocking action. In many cases the adherence of such a metal reenforcment is promoted by preliminarily coating it with suitable bakelite metal enamel compositions or other phenolic condensation cementing or coating material which is especially adherent to metal, since this facilitates the adherence of the phenolic condensation cementing material in the adjacent or enclosing fabric or other fibrous material. In some cases also other wear resisting or gripping members may be used such as the plugs or lengths 56 of woven, braided or other cord or rope carrying or impregnated with suitable proportions of phenolic condensation cementing material which may unite the members to the stiffener layers.

Figure 8:
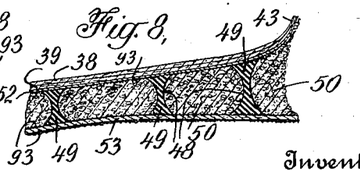
Figs. 8 and 9 are similar views through other cushioning members of this character.
Figure 9:
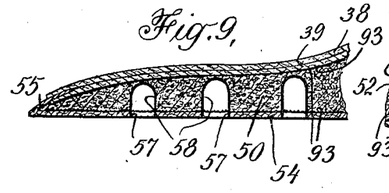

It is desirable to unite one or more layers of vulcanized rubber to adjacent or enclosing fabric strips or elements in other connections and as indicated in Figs. 7 to 9 this is a desirable method of making cushioning insole and arch supporting members for boots and shoes. For such purposes it is advantageous to have a fairly strong and stiff supporting member on which the foot of the wearer is supported and over which the weight distributed, and such a stiffened supporting member or layer may advantageously be formed of one or more sheets or layers 38, 39 of heavy canvas or other suitable cloth or fabric which has preferably been coated and impregnated with suitable phenolic condensation cementing material, such as bakelite varnish compositions. Such impregnated material, preferably after being dried may be cut to shape and the superimposed sheets aligned or temporarily held together in any suitable way as by stitching or cementing them by slight heat and pressure, or if desired, they may be partially cured and given their desired form by greater heating. The resilient element or material to give the desired cushioning action to such a supporting member may advantageously comprise vulcanized rubber in any suitable form, and if desired finely divided or porous rubber compositions may be used for this purpose, such as sponge rubber 50, which may more or less fill the space below such a supporting member which may fit within the shoe as indicated in Fig. 7 where the dotted lines indicate the shoe section in a somewhat diagrammatic way. It is usually desirable to have a base securing member incorporated in such a cushioning insole and for this purpose one or more layers or sheets of fabric 44 may have a frictioned or other rubber coating on their adjacent face to facilitate vulcanizing union with the rubber body, and if desired this securing member may also be rubberized on the opposite side by a frictioned or other rubber coating. In some cases suitable aligning connections may be advantageously used between these parts and as indicated one or more strips of rubberized or other canvas or fabric 45 may be used for this purpose having one end, such as 47, vulcanized or otherwise connected to the base securing member or fabric, while its other end 46 is connected in any suitable way to the supporting member. These fabric elements may be assembled in a suitable vulcanizing mould with the desired amount of vulcanizable sponge rubber composition and the heat of the mould may be used to vulcanize the rubber elements and simultaneously secure the rubber to the adjacent fabric members, the expansion of the sponge rubber composition exerting sufficient pressure to force the other parts outward against the mould and securely unite all these elements into an integral structure. By shaping the cooperating mould element the supporting member may be given the desired curved or arched up form so as to fit the wearer's foot to the extent desired for supporting the arch of the foot, etc., and specially arched up and strengthened supporting members may be made for cases of fallen arch or other weakness. It is of course advantageous to have this face of the mould properly surfaced so as to form a smooth surface on some or all parts of this supporting member. It is sometimes desirable to have the edges 43 of this member of relatively thinner and weaker material so that they may be more easily removed to fit shoes of different sizes, and this may be effected by either squeezing out a considerable part of the cementing material originally present in these edge portions of the supporting member or by other means so as to considerably decrease its stiffness, hardness and strength. In some cases it is desirable to use instead of or in connection with such a sponge rubber resilient body any suitable arrangement of perforated or separated vulcanized rubber members, such, for example, as the bridge pieces indicated in Fig. 7 which may in some cases advantageously have relatively thin or reduced area neck portions 48 and correspondingly broader bases 49 which may be vulcanized or otherwise cemented or secured to the upper and lower fabric layers before the resilient body material is put in place, or at the same time that all of the parts are cured, vulcanized and united.

Fig. 8 shows on a somewhat larger scale another arrangement of such a resilient cushioning insole in which a somewhat thinner connector fabric 52 may be used in connection with the stiffened supporting member comprising the layers 38, 39 of impregnated canvas or other fabric. This connector may have a frictioned or other rubber coating 93 on its lower surface next the rubber body, and a similar coating 93 which may be provided on the inner surface of the base securing member or fabric 53 considerably promotes the vulcanizing union of these parts to the interposed resilient body member of vulcanized rubber, such as the sponge rubber 50 and bridges 48 indicated which may of course be spaced apart in any suitable way. By forming a suitable rubberized coating 93 on the lower surface of the securing member or fabric, it may be cemented into the shoe by the use of suitable rubber cement to secure it to the permanent inner sole member. Fig. 9 shows a similar cushioning member adapted to support the wearer's heel and in this case the base securing member 54 which may comprise one or more layers of canvas or other suitable fabric may be formed with one or more aligning connections 55, such as the upturned tongue or flap indicated which may be cemented or otherwise secured to the impregnated layers 38, 39 forming the stiffened suporting member as by being interposed between them before the curing and moulding operation. The body of this cushioning member may comprise or consist of any resilient rubber composition such for example, as sponge rubber 50 which may of course be previously formed and then cemented or secured in place with or without the securing member, or if desired, the elastic body may be simultaneously formed, vulcanized and secured to the other parts at the same time that they are cured and cemented together in a suitable mould. If desired the mould may have pins projecting upward through previously formed holes 57 in the securing member to form suitably spaced holes 58 at intervals through the sponge or other resilient rubber body.

Leggings or other articles, including wearing apparel of various kinds, may be formed of canvas or other fabric or fibrous material stiffened and strengthened by the incorporation therewith of suitable proportions of cured, phenolic condensation cementing material before or after the articles have been tailored and stitched or otherwise united. Where such hard curing cementing materials as bakelite varnish compositions are used for this purpose, the cured impregnated fibrous material may be given a much greater stiffness and strength than ordinary leather of the same thickness, and a legging containing several plies of canvas containing 40 or 50 percent of such cured phenolic condensation cementing material may be made extremely stiff and strong and resistant to indentation or puncture while still quite thin and light in weight. The cured fabric is thus practically inextensible under service conditions, although it can be bent along a substantially straight line to a sufficient extent to apply and take off the legging. Of course, if desired, parts of the fabric of such legging or other article may be coated or impregnated with rubber or with special soft curing phenolic condensation cementing material of the character described, where greater flexibility is desired combined with the water repellant and other properties which can be secured in this way; and if desired parts of the article may be made more flexible by reducing the thickness of such fabric or fibrous material carrying such hard cured phenolic condensation cementing material or by replacing such stiffening cementing material to a greater or less extent by vulcanized rubber or other coating or facing composition.

Figures 10, 11, 12, 13, 14, 15, 16, 17:
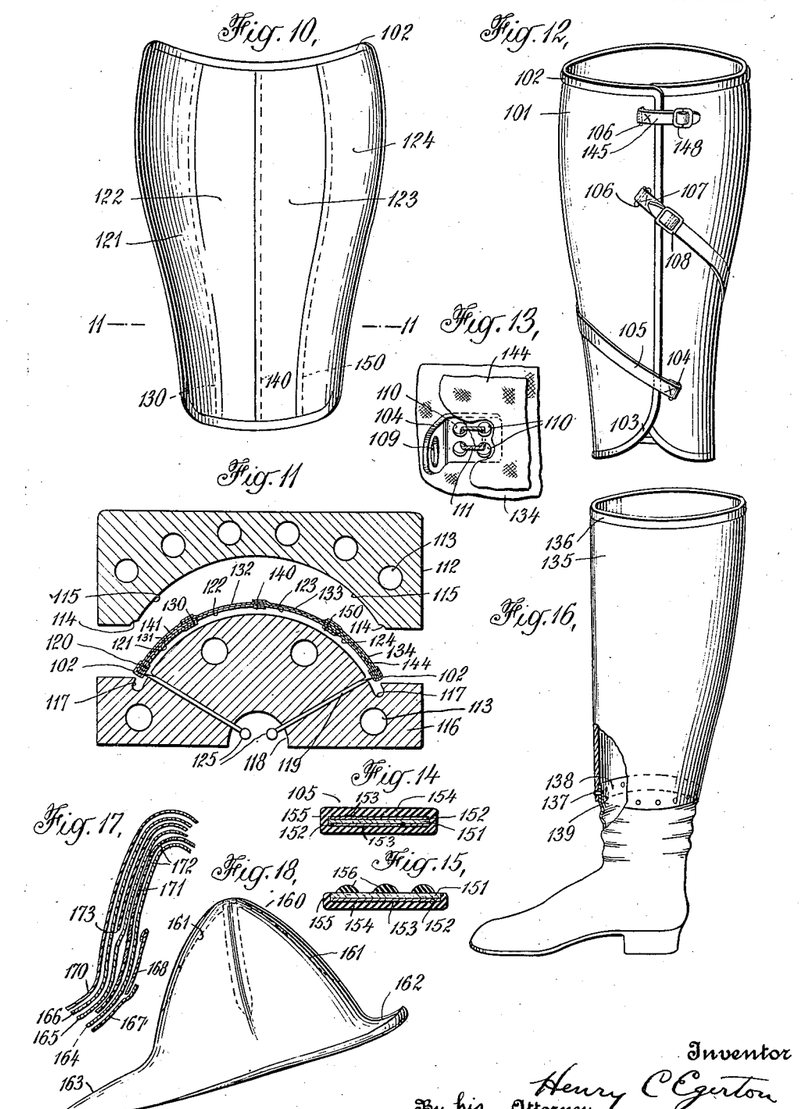
Fig. 10 is a perspective view diagrammatically showing a legging blank or unfinished legging which may be made by this process.
Fig. 11 is a transverse section taken substantially along the line 11—11 of Fig. 10 showing in separate position such a blank and cooperating mould sections by which the curing process may be effected.
Fig. 12 is a perspective view showing the completed legging with attached fastening straps and devices.
Fig. 13 is a partial detail view on a large scale showing the method of incorporating the strap securing member.
Fig. 14 is an enlarged detail transverse section through the fastening strap.
Fig. 15 is a similar view of another form of strap.
Fig. 16 is a perspective view showing a boot top secured to an upper to form a riding boot.
Fig. 17 is a diagrammatic section showing in separated position the parts which may be used to form another article.

Figs. 10 and 11 show one form in which the legging blank may be produced. A number of strips or gores of canvas or other fabric preferably thoroughly impregnated with such phenolic condensation cementing material as bakelite varnish and dried can be cut into the desired shape so as to more or less fit the shape of the leg by any usual tailoring methods, and these strips may be of multiple thickness at various parts of the legging and sewed together by such lines of stitching as 120, 130, 140 and 150 indicated. In the middle of the legging which is intended to cooperate with the back of the leg the fabric may have, if desired, several thicknesses, two thicknesses being indicated in Fig. 11 so that the strip 122 is reenforced by a corresponding strip 132 outside and the strip 123 is similarly reenforced by the outer strip 133. The edge or front strips of the legging where greater strength and stiffness is permissible and desirable may be made of a correspondingly greater number of strips of canvas or other fabric or fibrous material, such as linen or other suitable heavy cloth or even heavy or loose fibred paper, cotton batting or the like for the inner layers in some cases. All of these layers should, of course, have applied to and preferably incorporated therewith such phenolic condensation cementing material at least in sufficient amounts so that the whole is thoroughly cemented together under the shaping and curing processes used. As indicated in Fig. 11 these edge or front strips of the leggings may comprise the canvas or other fabric layers or gores 121, 131 and 141 on one side and 124, 134 and 144 on the other edge of the legging.

It is desirable also to have the peripheral edge of the legging suitably reenforced by additional impregnated fibrous material or in some cases by an additional thickness of the cementing material itself, and as indicated in Figs. 10 and 11 an edge reenforcement of braid or the like 102 impregnated with such cementing material may be carried around the entire periphery of the legging blank and stitched in place as by the stitching 120. If desired also a rubberized edge portion may be used in addition to or in connection with such an edge reenforcement, and in some cases rubber facing or lining elements may also be used in other parts of the legging. For this purpose a strip or layer of vulcanizable rubber composition of any desired color, preferably in connection with an adherent frictioned rubber fabric strip, may be carried around the edge of the legging or at least around the bottom part 103 thereof where it engages the shoe of the wearer so as to minimize slipping and wear of these parts.

The blank is under these conditions more or less curved up because of its tailored shape and the greater width of the central portions of the strips or gores, and the material may advantageously be at least partially cured while in this partially bent up shape which somewhat simplifies the mould sections necessary, although, of course, if desired, a sectional or other mould may be used and the legging at once bent around into substantially its final nearly closed form and cured and stiffened in that shape. As indicated in Fig. 11 the lower mould section 116 may be considerably curved along this lower part of the legging indicated by the line 11—11 of Fig. 10 and for some purposes it is desirable to form an edge recess, such as 117, to receive the edge of the blank, which may with advantage in some cases have been at this time reenforced by such a braid or other edge reenforcement, so that this thicker edge recess may give the edge a somewhat increased thickness as compared to the adjacent body of the blank. For this purpose a cooperating recess 114 may be formed in the upper mould section 112, although this is not of course necessary in all cases. It is advantageous to smoothly stretch or bend the blank around the mould before the mould sections are finally and firmly pressed together and for this purpose it is desirable to have the convex mould section, for instance, in somewhat heated condition at least, as by the use of steam or other heating pipes 113 which may extend therethrough at suitable intervals. The blank may have its front section 124 forced or crowded into the corresponding edge recess 117 by any suitable means and retained in that position by securing or fastening means of any suitable character, such, for instance, as the securing aligning pins 119 which may have more or less sharp upper ends to engage and pass partly or all the way through the legging section at this point, thus retaining this edge or side of the blank in position on the mould. The other parts of the legging may then be drawn or forced smoothly over the rest of the mould and the opposite edge forced or crowded into the corresponding edge recess on the other side and retained in this position by protruding the corresponding securing aligning pins on the other side of the mould as by forcing or striking on their enlarged heads 125 located in a central recess 118 in this mould section. Of course, in some cases it is advantageous to apply additional heat to the outside of the impregnated legging blank and heated or other smoothing or stretching tools or implements may be used for this purpose. The mould sections may then be forced together, the upper mould section being similarly provided with suitable steam or other heating pipes or openings 113 by which the mould may be substantially uniformly heated so that when the mould sections are strongly pressed together the legging blank is forced accurately into the various parts of the mould and the softened or melted cementing material more or less flows or passes into any open spaces to give a smooth or other desired surface to the article as determined by the smooth or other surface 115 given to the mould sections, as well as to fill up any spaces around the edges or other portions of the mould. For some purposes it is desirable to substantially or entirely withdraw the securing or aligning pins as soon as the mould sections have closed together and this may of course be conveniently done by forcing or wedging backward their enlarged heads 125 so that the pointed ends of the pins are substantially flush with the inner surface of the mould section in which they are mounted. The curing of this bakelite impregnated material is effected for such times and at such heats as to securely cement the cooperating layers of fabric together and at least partially cure the cementing material therein, but it is desirable where the legging has only been partially shaped in this preliminary mould to leave at least a considerable proportion of the cementing material in not more than partially cured condition so that under still higher heats it can be completely cured after the article has been bent or formed to its final shape. For this purpose the curing heats may be from 250 to 300 degrees Fahrenheit more or less and the time of curing correspondingly varies so that at a temperature of about 300 degrees in the fabric such a preliminary partial curing could take place in five to twenty minutes or so. The partially cured and preliminarily shaped article, which is more or less yieldable when heated because of the semi-cured condition of the cementing material, may then be bent and formed under suitable heat to its desired final shape in any convenient way around a heated shaping mould for instance.

The legging may of course be provided with any desired fastening straps or other securing members which may be riveted or otherwise attached or incorporated, and one convenient arrangement is shown in Fig. 12 as comprising one or more metallic strap securing loops or members 104 which as indicated in Fig. 13 may each have an opening 109 in its upstanding portion projecting from the outer surface of the legging. The body of this securing member may be formed with suitable holes or perforations 110 which assist in securing the member as by the stitching 111 to one of the inner layers of canvas or other fabric, such as 134, and which also greatly assist in holding the securing loop in position by the penetration of the cementing material into these holes so that when cured it interlocks therewith and definitely and strongly holds the securing member in position. It is of course understood that the upper mould section 112 shown in Fig. 11 is formed with suitable openings to accommodate the protruding portions of these securing members which are of course bent into such shape as to properly enter these moulds when the mould sections close. The protruding end of the strap securing loop may of course extend through a suitable slot or cut formed in the one or more outer layers of fabric, such as 144, so that in the completed legging this strap securing loop is in position to be engaged by a strap 105 adapted to extend once or more around the legging and fasten the same in adjusted position on the leg of the wearer as usual. As indicated in Fig. 12, this strap is shown as cooperating with a suitable buckle 108 on the short buckle strap 107 secured to a similar strap securing loop 106 protruding from the other edge or side of the legging. If desired also an upper securing and aligning strap 145 may be secured to a similar securing loop 106 and cooperate with a buckle 148 riveted or otherwise secured to the opposite edge.

A suitable construction for such a legging strap 105 is somewhat diagrammatically indicated in Fig. 14, in which one or more layers 151 of thin canvas or other fabric may be impregnated or coated with such phenolic condensation cementing material as dried bakelite varnish and preferably arranged in connection with connector layers 152 on one or both sides which may carry frictioned or other rubber coatings 153. A relatively thin reenforcing and strengthening strip or layer may thus be formed which may be less than a thirty-second of an inch thick when cured under pressure so as to be quite flexible and it is desirable to cure a layer of vulcanized rubber 154 to one side at least of such a reenforcing member so that it may more securely engage the legging and minimize slipping of the parts under service conditions. This rubber facing layer may, if desired, extend on both sides of the reenforcing strip in which case it may advantageously have portions 155 extending around the edges of the strap, and these parts may of course be cured, vulcanized and cemented together in a suitable mould under pressure as previously described. By uniting an elastic vulcanized rubber layer or facing, which may have considerable thickness and strength to impregnated cured fabric of this character, the rubber greatly strengthens the fabric against breaking and cracking so as to make it much more desirable for use in straps, belts and other articles where flexibility is desired. Such a composite article or fabric may of course be used in other connections and mats, stair treads, and packing members may be made up in this general way, and also photographic trays and other containers where the edges of the articles are turned upward preferably in connection with suitable reenforcing strips or members, which may comprise metallic plate or other reenforcements. Fig. 15 shows another way in which this strap may be made so as to comprise the stiffener body or layer 151 of canvas or other fabric or fibrous material preferably thoroughly impregnated with such phenolic condensation cementing material as bakelite varnish compositions. The fabric connector layer 152 in contact therewith may if desired have a rubberized coating 153 on the outside to more easily and thoroughly unite thereto the vulcanized rubber coating or layer 154 which may have edge portions 155 if desired. The fabric body member 151 may thus be exposed on the other side and may have securely cemented and united thereto ornamental or other trimmings or fittings 156 of any desired form and arrangement which may be of moulding bakelite or other phenolic condensation cementing composition with which in some cases more or less fibrous, inert or coloring material has been incorporated. All of these parts may be conveniently cured, vulcanized and united by moulding under pressure at suitable heat, and in this way articles of any desired form, construction and purpose may be provided with united phenolic condensation and vulcanized rubber portions or elements. Resilient or other vulcanized rubber facing or other portions may thus be united to substantially rigid or other bakelite articles for instance, and vulcanized rubber articles of various kinds may be formed with inserts or projecting portions of solid or other phenolic condensation material for various purposes.

As indicated in Fig. 16 boot tops or the like may be advantageously formed of generally similar canvas or other fabric coated or impregnated with such phenolic condensation cementing material by winding or arranging a plurality of layers of such impregnated fabric around a suitable mould or form. The article may be cured in such final position by the use of the desired curing heat, the layers of fabric being preferably held in this closely arranged position by cooperating outer mould sections or other desired means, such as enclosing and holding members of sheet metal or the like. As indicated the boot top 135 of such construction may be formed with an edge reenforcement, such as 136, of rubber composition or of braid or the like impregnated with such cementing material and cured at the same time as the body of the article so as to be permanently and securely cemented thereto. Such a boot top may, of course, be secured to the upper edge of the rubber, leather or other boot upper 139 in any suitable or desired way as by stitching, riveting or cementing methods or combinations thereof. As indicated a series of rivets 138 are shown as connecting these parts, the lower portion of the stiffened boot top being preferably given the form of a reduced thickness attaching flange 137 to minimize any internal projection of these uniting surfaces. If desired, however, such a stiffened boot top preferably after having a vulcanized rubber facing vulcanized or secured thereto may be cemented or otherwise united to a special canvas or other shoe upper of the type shown in Fig. 1, the canvas or other fabric of the upper preferably in that event being given a heavy facing layer of vulcanized rubber extending to and incorporated with the rubber sole so as to make the entire boot thoroughly waterproof.

Other suitable apparel or other articles may be made by these processes, and as shown in Figs. 17 and 18 the hat or helmet suitable for firemen's use may be made up in this way of a plurality of layers of cured impregnated fabric and vulcanized rubber in which metal reenforcements may be incorporated, if desired. Fig. 16 shows diagrammatically in separated position different parts which may be used and as indicated one or more layers 164, 165 of suitable knit or other fabric, such as heavy knit cotton fabric may be impregnated with such phenolic condensation cementing material as bakelite varnish compositions and then substantially dried and shaped up, preferably after slight heating, as by applying these layers to a suitable form or mould. In some cases where additional strength is desired in parts or all of the article a previously shaped metal reenforcement may be incorporated therewith preferably between two such impregnated layers of fabric or other fibrous material. As indicated a steel or other metallic reenforcing plate 171 preferably provided with suitably spaced holes 172 may be interposed between these two impregnated fabric layers and additional layers 173 of canvas or other suitable fabric similarly impregnated may be applied to various portions where reenforcement is desired, such as the reenforcing portions or ribs 161 which may extend down from the top of the helmet or article to the desired extent as shown in Fig. 17. Where additional waterproofing or similar protection is desired, a vulcanized rubber layer may be secured or cemented to the article and it is usually desirable to interpose rubberized fabric layers, such as 166, at these points with their rubber coating adjacent the vulcanized rubber layers or sheets such as 170 on the outside of the fabric and the lining layer 167 which may be used on the inside of the rim. A band supporting strip or member 168 may also be cemented in place by having its lower edge coated with suitable phenolic condensation cementing material and forced against the adjacent impregnated strips in the mould. By strongly forcing together in a heated mould the parts to be united they may all be united and simultaneously vulcanized and cured so as to make a practically integral article or structure 160 of this character and the rim portions 162, 163 may of course be simultaneously shaped in the desired way by correspondingly shaping the mould sections used. The supporting band 168 may of course be held in separated position by special removable mould sections so as to cement it in desired position or a narrow slightly projecting band may be used which may be subsequently sewed or otherwise attached to the hat or head band employed.

This case is a continuation in part of my co-pending applications, Serial No. 233,000, filed May 7, 1918, Serial No. 244,340, filed July 11, 1918, and Serial No. 248,824, filed August 8, 1918, that is, it contains subject-matter taken therefrom. This invention has been described in connection with a number of illustrative materials, compositions, temperatures, times and orders of steps and illustrative articles, embodiments, forms, proportions, elements, parts and shapes, to the details of which disclosure the invention is not of course to be limited, since, for example, these processes may be used in making other styles, types and classes of articles and devices.

What is claimed as new and what is desired to be secured by Letters Patent is set forth in the appended claims.

1. The process of forming a stiffened footwear member which comprises simultaneously compressing and heating vulcanized rubber composition and fabric impregnated with phenolic condensation cementing material and a metallic reenforcement engaging said fabric to cure and stiffen said fabric and unite such elements.

2. The process of forming a stiffened footwear member which comprises compressing and heating vulcanized rubber composition and fabric impregnated with phenolic condensation cementing material to cure and stiffen said fabric and unite such elements.

3. The process of forming a stiffened shoe sole element which comprises holding together and heating fibrous material carrying phenolic condensation cementing material, vulcanized rubber composition and an interposed rubberized connector fabric to unite and shape the same.

4. The process of forming a stiffened shoe sole element which comprises holding together and heating fibrous material carrying phenolic condensation cementing material and vulcanized rubber composition to unite the same.

5. The process of forming a shoe stiffening member which comprises simultaneously shaping and heating fabric impregnated with phenolic condensation cementing material and an incorporated metallic reenforcement to solidify such material throughout portions of said member and stiffen the same and form attaching portions of said member penetrable by attaching devices.

6. The process of forming a shoe stiffening member which comprises shaping and heating fibrous material carrying phenolic condensation cementing material and a metallic reenforcement to cure such material throughout portions of said member and stiffen the fibrous material and secure said reenforcement thereto.

7. The process of making vulcanized rubber articles having incorporated stiffening members, and adapted for use as shoe soles which comprises forcing together and moulding a plurality of layers of fabric carrying and impregnated with phenolic condensation cementing material, an interposed metallic reenforcement, connector fabric having a rubberized coating and a facing layer of vulcanizable rubber composition and simultaneously heating such elements to cure the phenolic condensation cementing material and cement together the stiffening members around said metallic reenforcement and unite said connector and vulcanized rubber thereto.

8. The process of making vulcanized rubber articles having incorporated stiffening members, which comprises forcing together and moulding fabric carrying phenolic condensation cementing material, an interposed metallic reenforcement, connector fabric having a rubberized coating and a layer of vulcanizable rubber composition and simultaneously heating such elements to cure, vulcanize and unite said elements.

9. The process of making vulcanized rubber articles having incorporated stiffening members, which comprises forcing together fabric carrying phenolic condensation cementing material, a metallic reenforcement, connector fabric having a rubberized coating and vulcanizable rubber composition and simultaneously heating such elements to cure, vulcanize and unite said elements.

10. The process of making vulcanized rubber articles having incorporated stiffening members, which comprises forcing together fibrous material carrying phenolic condensation cementing material, a metallic reenforcement, connector fabric having a rubberized coating and vulcanizable rubber composition and heating such elements.

11. The process of making a vulcanized rubber article having a connected metallic member which comprises forcing together fabric carrying phenolic condensation cementing material and said metallic member having portions substantially enclosed therein and rubber composition, and simultaneously heating, molding and uniting said elements.

12. The process of making a vulcanized rubber article having a connected metallic member which comprises forcing together fibrous material carrying phenolic condensation cementing material and said metallic member and rubber composition, and simultaneously heating and uniting said elements.

13. The process of uniting vulcanized rubber and phenolic condensation cementing elements which comprises forcing together and heating vulcanizable rubber composition and fibrous material carrying phenolic condensation cementing material to unite the elements.

14. The process of uniting vulcanized rubber and a cooperating reenforcing element comprising phenolic condensation cementing material which comprises effecting the penetrating engagement of the opposite sides of fabric by vulcanizable rubber and phenolic condensation cementing material and heating such elements to vulcanize the rubber and cure the phenolic condensation cementing material and simultaneously unite the elements.

15. The process of uniting vulcanized rubber and a cooperating element comprising phenolic condensation cementing material which comprises effecting the engagement of fabric by rubber and phenolic condensation cementing material and heating such elements to vulcanize the rubber and unite the elements.

16. The process of uniting vulcanized rubber and an element containing phenolic condensation cementing material which comprises heating vulcanizable rubber composition and fabric carrying phenolic condensation cementing material to vulcanize the rubber and unite the rubber to said element.

17. The process of uniting a vulcanized rubber element and a cooperating element comprising phenolic condensation cementing material which comprises simultaneously uniting said elements by heat and pressure to the opposite sides of fabric and thereby cementing and strengthening said fabric.

18. The process of uniting a vulcanized rubber element and a cooperating element comprising phenolic condensation cementing material which comprises uniting said elements by heat to fibrous material.

19. The process of uniting a vulcanized rubber element and a cooperating element comprising phenolic condensation cementing material which comprises uniting said elements to porous material.

20. The process of uniting vulcanized rubber and phenolic condensation cementing elements which comprises forcing together and heating vulcanizable rubber composition and material carrying phenolic condensation cementing material and an interposed rubberized fibrous connector to unite the elements.

21. The process of making vulcanized rubber articles having incorporated stiffening members which comprises assembling a fabric stiffening member carrying and impregnated with phenolic condensation cementing material, connector fabric having a rubberized coating and a layer of vulcanized rubber composition adjacent said coating and simultaneously heating, compressing and molding said elements to cure the phenolic condensation cementing material and unite said vulcanized rubber and said stiffening member to said connector.

22. The process of making vulcanized rubber articles having incorporated members which comprises assembling a porous member carrying phenolic condensation cementing material, connector fabric having a rubberized coating and vulcanized rubber composition adjacent said coating and heating said elements to cure the phenolic condensation cementing material and unite said vulcanized rubber and said member to said connector.

HENRY C. EGERTON.